United States Patent
Gong et al.

(10) Patent No.: US 9,997,897 B2
(45) Date of Patent: Jun. 12, 2018

(54) QUICK CONNECT AND DISCONNECT CABLE JUNCTION BOX

(71) Applicants: STATE GRID CHANG ZHOU CURRENT SUPPLY COMPANY OF JIANGSU ELECTRIC POWER COMPANY, Changzhou (CN); STATE GRID JIANGSU ELECTRIC POWER COMPANY, Nanjing (CN); STATE GRID CORPORATION OF CHINA, Beijing (CN)

(72) Inventors: Bing Gong, Changzhou (CN); Yongming Qin, Changzhou (CN); Jianjun He, Changzhou (CN); Zhen Xu, Changzhou (CN)

(73) Assignees: STATE GRID CHANG ZHOU CURRENT SUPPLY COMPANY OF JIANGSU ELECTRIC POWER COMPANY, Changzhou (CN); STATE GRID JIANGSU ELECTRIC POWER COMPANY, Nanjing (CN); STATE GRID CORPORATION OF CHINA, Beijing (CN)

( * ) Notice: Subject to any disclaimer, the term of this patent is extended or adjusted under 35 U.S.C. 154(b) by 0 days. days.

(21) Appl. No.: 15/524,928

(22) PCT Filed: Jul. 21, 2016

(86) PCT No.: PCT/CN2016/090844
§ 371 (c)(1),
(2) Date: May 5, 2017

(87) PCT Pub. No.: WO2017/024931
PCT Pub. Date: Feb. 16, 2017

(65) Prior Publication Data
US 2017/0338633 A1    Nov. 23, 2017

(30) Foreign Application Priority Data

Aug. 13, 2015    (CN) .......................... 2015 1 0495701
Aug. 13, 2015    (CN) ..................... 2015 2 0607761 U

(51) Int. Cl.
| | | |
|---|---|---|
| *H02G 1/02* | (2006.01) |
| *H01R 25/00* | (2006.01) |
| *H01R 13/74* | (2006.01) |
| *H01R 13/622* | (2006.01) |
| *H02G 15/10* | (2006.01) |

(52) U.S. Cl.
CPC ............. *H02G 1/02* (2013.01); *H01R 13/622* (2013.01); *H01R 13/74* (2013.01); *H01R 25/00* (2013.01); *H02G 15/10* (2013.01)

(58) Field of Classification Search
CPC ........ H02G 1/02; H02G 15/10; H01R 13/622; H01R 25/00; H01R 13/14
(Continued)

(56) References Cited

U.S. PATENT DOCUMENTS

| | | | |
|---|---|---|---|
| 8,269,101 B2 * | 9/2012 | Kane .................... | H01R 9/0506 174/50 |
| 8,283,562 B2 * | 10/2012 | Clifton ................. | H01Q 1/1235 174/53 |
| 9,742,172 B2 * | 8/2017 | Elford .................... | H02G 3/088 |

FOREIGN PATENT DOCUMENTS

| | | |
|---|---|---|
| CN | 203205820 U | 9/2013 |
| CN | 204349380 U | 5/2015 |

(Continued)

OTHER PUBLICATIONS

The World Intellectual Property Organization (WIPO), Written Opinion for PCT/CN2016/090844, dated Oct. 28, 2016, 6 Pages.

*Primary Examiner* — Dhirubhai R Patel
(74) *Attorney, Agent, or Firm* — Anova Law Group, PLLC

(57) ABSTRACT

The present disclosure provides a quick connect and disconnect cable junction box, including: a box body, insula-
(Continued)

tors, copper busbars, connection wires, T-shaped cable terminals, linear adapters, and an insulation spacer. The insulators, the copper busbars, the connection wires, and the T-shaped cable terminals are positioned inside the box body. The linear adapter includes a conductive rod, an insulation layer, a quick engagement connector, and a housing. One end of each of three linear adapters is electrically connected to the T-shaped cable terminal inside the box body. The three linear adapters, three T-shaped cable terminals, three connection wires, and three copper busbars form a three-phase electrical path. During operation, the three copper busbars are correspondingly connected to three phase lines of an incoming cable of a ring main unit; and the three linear adapters are engaged with quick connectors of three bypass cable connectors via the quick engagement connectors thereof.

5 Claims, 6 Drawing Sheets

(58) Field of Classification Search
USPC .......................................................... 174/59
See application file for complete search history.

(56) References Cited

FOREIGN PATENT DOCUMENTS

| CN | 105071335 A | 11/2015 |
| CN | 204835464 U | 12/2015 |
| DE | 3506119 A1 | 8/1986 |

* cited by examiner

QUICK CONNECT AND DISCONNECT CABLE JUNCTION BOX

CROSS-REFERENCES TO RELATED APPLICATIONS

This application is a national phase entry under 35 U.S.C. § 371 of International Application No. PCT/2016/090844, filed on Jul. 21, 2016, which claims the priority to Chinese Patent Application No. 201510495701.1 and Chinese Patent Application No. 201520607761.3, both filed with the State Intellectual Property Office of P. R. China on Aug. 13, 2015, the entire contents of all of which are incorporated herein by reference.

TECHNICAL FIELD

The present disclosure relates to the technical field of bypass operation devices in power lines and, more particularly, relates to a quick connect and disconnect cable junction box used in bypass operations of inspecting and repairing a ring main unit.

BACKGROUND

During bypass operations on cable lines, a bypass cable and related devices are often used to quickly build a bypass power supply line in the field, bridging a to-be-inspected or to-be-rush-repaired cable line segment or device, where reverse switching is used to substitute the original line with the bypass line for providing power supply to users. In the meantime, workers perform maintenance, overhaul and replacement operations on the to-be-inspected cable line segment or device in the original line at power off state. In bypass operations for inspecting and repairing a ring main unit, there are two main difficulties when building the bypass cable system. First, a power supply point should be connected, which is generally a spare section of a nearby ring main unit; second, environment for laying the bypass cable should be good, avoiding frequent road crossing. The two difficulties and load-intensive characteristics of city center area contradicts each other, because ring main units in city center area rarely have a spare section. In the search for a power supply point, further locations are searched to find another ring main unit having the spare section, which extends the distance for laying bypass cable line, increases the amount of construction work, prolongs operation period, increases the quantity of bypass devices, and thus raising security risks.

Based on practical needs of field operations, if there could be a switching equipment developed to connect an incoming cable of the original ring main unit with a bypass cable, readily-laid power cable can become part of the bypass cable, solving the difficulties of power supply point and long-distance layout. 10 kV lines in domestic distribution network often adopt XLPE insulated power cables, an indoor cable terminal having naked wire-connecting terminal or a T-shaped cable terminal having closed line-connecting terminal is normally installed based on structures of the ring main unit, the connection mode between the indoor cable terminal and the ring main unit being bolt fastening mode. Bypass cable operation devices adopt flexible power cables, in the end of which are installed with quick connect and disconnect bypass cable connector. Cable junction box is a device often used in power lines for performing branching and transferring on cables. However, connectional cable junction box is limited by its structure and cannot be directly connected to a bypass cable.

BRIEF SUMMARY OF THE DISCLOSURE

The present disclosure aims to: address practical difficulties in inspection and repair operations of ring main units and provide a quick connect and disconnect cable junction box for quickly connecting an incoming cable of a ring main unit with a bypass cable, which achieves direct and fast electrical connection between the incoming cable of the ring main unit and a bypass cable device under various complex environments in the field, which jointly forms a temporary bypass cable power supply line, thereby performing rush repair or inspection on the ring main unit at power off state, without affecting power supply to users.

The technical solution of the present disclosure is to provide a quick connect and disconnect cable junction box, the structural characteristics are: including a box body, insulators, copper busbars, connection wires, T-shaped cable terminals, linear adapters, and an insulation spacer.

The insulators, the copper busbars, the connection wires, and the T-shaped cable terminals are positioned inside the box body; the quantities of the insulators, the copper bars, the T-shaped cable terminals, and the linear adapters are respectively three; and a quantity of the connection wires is 3.

The copper busbar includes a front wire-connecting terminal and a rear wire-connecting terminal, both of which being connected together as one piece. The 3 copper busbars are respectively disposed on the 3 insulators, with one copper busbar fixed on one insulator.

The linear adapter includes a conductive rod, an insulation layer, a quick engagement connector, and a housing.

The conductive rod includes a front cylinder body and a rear cylinder body, both of which are connected together as one piece. A diameter of the front cylinder body of the conductive rod is greater than a diameter of the rear cylinder body. A thread hole that concaves inward from front to rear is disposed in the front cylinder body of the conductive rod along an axial direction. Threads are fixedly configured in the thread hole of the conductive rod. A bypass cable plug hole that concaves inward from rear to front is configured in the rear cylinder body of the conductive rod along the axial direction. An elastic fastening ring is coupled to the bypass cable plug hole.

The insulation layer covers an outside surface of the conductive rod. The insulation layer includes, sequentially from front to rear, a first truncated cone portion, a second truncated cone portion, a first cylinder portion, a second cylinder portion, and a third cylinder portion, all of which are hollow and are connected together as a whole piece. An outer diameter of the first truncated cone portion is less than an outer diameter of the second truncated cone portion. Outer diameters of the first cylinder portion, the second cylinder portion, and the third cylinder portion are sequentially reduced.

The quick engagement connector is fitted and connected at a rear end of the second truncated cone portion of the insulation layer, with a rear portion of the third cylinder portion of the insulation layer passing through the quick engagement connector and extending outward. The housing is fixedly installed on an outer surface of the second truncated cone portion of the insulation layer and is fixedly connected to a front end of the quick engagement connector.

The linear adapters are, through the respective housings, fixedly disposed on a rear panel at a lower part of the box body. The quick engagement connectors of the linear adapters are located outside the rear panel at the lower part of the box body. The 3 linear adapters are each fixedly connected to a corresponding bolt of the T-shaped cable terminals through the threads in their respective conductive rods. An upper end of each of the 3 T-shaped cable terminals is, using one of the connection wires, electrically connected to the corresponding rear wire-connecting terminal of one of the 3 copper busbars respectively.

The insulation spacer is fixedly disposed inside the box body and is located in front of the T-shaped cable terminals and the connection wires.

During operation, the front wire-connecting terminals of the 3 copper busbars are respectively connected to corresponding A, B, and C three-phase lines of the incoming cable of the ring main unit. The three linear adapters connect, through their respective quick engagement connectors, to quick connectors of three bypass cables.

A further solution includes: an overall shape of the box body is a cuboid shape, and the box body is hollow. An upper part of the box body is configured to include an openable box door in the front. The box door is provided with a lid lock. Both sides of the lower part of the box body are provided with heat dissipation windows. A front face of the lower part of the box body is configured to include an openable cable-passing door. Four corners at a bottom of the box body are fixedly installed with four wheels with foot brakes.

A further solution includes: external dimensions of the box body are 680 mm in length, 535 mm in width, and 1150 mm in height.

A further solution includes: the T-shaped cable terminals are standard bolt-fastening type T-shaped cable terminals.

A further solution includes: the quick engagement connectors of the linear adapters are standard quick engagement connectors. A front end of the quick engagement connector is provided with a mounting fixation ring. The housing is formed by two vertically symmetrical parts. An outer shape of the housing after installation is square. An inner shape of the housing is compatible with an outer shape of the second truncated cone portion of the insulation layer. A rear end inside the housing is provided with a fixation ring socket groove. The quick engagement connector is fixedly connected to the housing through a compatible coupling between the mounting fixation ring of the housing and the fixation ring socket groove.

A further solution includes: a material of the insulation layers of the linear adapters are EPDM (Ethylene Propylene Diene Monomers) rubber material having a compressive stress of 8-12 kg/cm².

Figure 1:
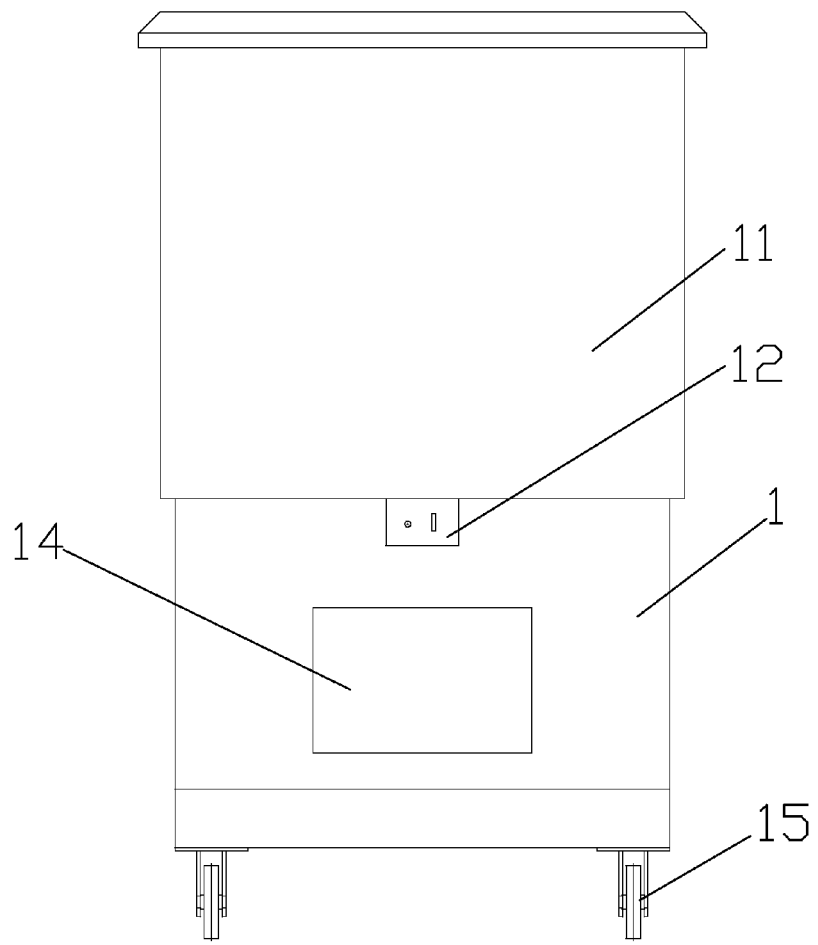
FIG. 1 is an external structure diagram of the present invention.

Reference numbers used in the figures: box body 1, box door 11, lid lock 12, heat dissipation window 13, cable-passing door 14, wheel 15, insulator 2, copper busbar 3, front wire-connecting terminal 31, rear wire-connecting terminal 32; connection wire 4, T-shaped cable terminal 5, linear adapter 6, conductive rod 61, threads 61-1, bypass cable plug hole 61-2, elastic fastening ring 61-3, front cylinder body 61-4, rear cylinder body 61-5, thread hole 61-6, insulation layer 62, first truncated cone portion 62-1, second truncated cone portion 62-2, first cylindrical portion 62-3, second cylindrical portion 62-4, third cylindrical portion 62-5, quick engagement connector 63, mounting fixation ring 63-1, housing 64, mounting ring socket groove 64-1; insulation spacer 7, incoming cable of ring main unit 8, bypass cable 9, quick connector 91.

DETAILED DESCRIPTION

The present disclosure is further described in details together with various embodiments and accompanying drawings.

Embodiment 1

Referring to FIGS. 1-4, the quick connect and disconnect cable junction box of this embodiment mainly includes: a box body 1, insulators 2, copper busbars 3, connection wires 4, T-shaped cable terminals 5, linear adapters 6, and an insulation spacer 7.

An overall shape of the box body 1 is a cuboid shape, and the box body 1 is hollow inside. Based on practical operation experiences, external dimensions of the box body 1 are preferred to be 680 mm×535 mm×1150 mm (length×width× height), to accommodate actual operating environments when inspecting and repairing a ring main unit, such as small or irregular work space, a reserved length of original cables of the ring main unit being not long enough, etc. An upper part of the box body 1 is configured to include an openable box door 11 in the front, and the box door 11 can be locked by a lid lock 12. Both sides of the lower part of the box body 1 are provided with heat dissipation windows 13. A front face of the lower part of the box body 1 is configured to include an openable cable-passing door 14. Four corners at a bottom of the box body 1 are fixedly installed with four wheels 15 with foot brakes. The purpose of providing the wheels 15 is to make the box body 1 easy to move during operation, which facilitates the inspection and repair works.

Three insulators 2 are provided, the three insulators 2 are fixedly disposed at an upper rear part inside the box body 1.

Three copper busbars 3 are provided, each having a same structure. The three copper busbars 3 are respectively disposed on the three insulators 2, with one copper busbar fixed on one insulator. The copper busbar 3 includes a front wire-connecting terminal 31 and a rear wire-connecting terminal 32, both of which being connected together as a whole piece.

Three connection wires 4 are provided.

The T-shaped cable terminals 5 are fixedly disposed inside a lower part of the box body 1. The T-shaped cable terminals 5 may be standard bolt-fastening type T-shaped cable terminals. Three T-shaped cable terminals 5 are provided, each having a same structure. An upper end of each of the three T-shaped cable terminals 5 is, using one of the connection wires 4, electrically connected to a corresponding rear wire-connecting terminal 32 of one of the three copper busbars 3 respectively.

Three linear adapters 6 are provided, each having a same structure. The three linear adapters are fixedly disposed on a rear panel at a lower part of the box body 1.

Figure 5:
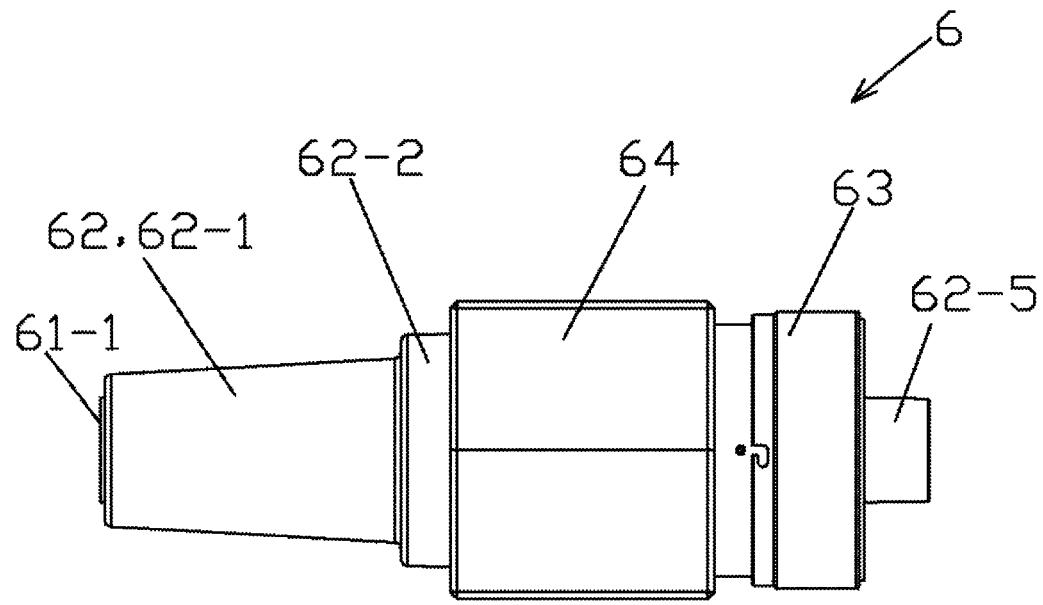
FIG. 5 is a structural diagram of a linear adapter shown in FIG. 4.
Figure 6:
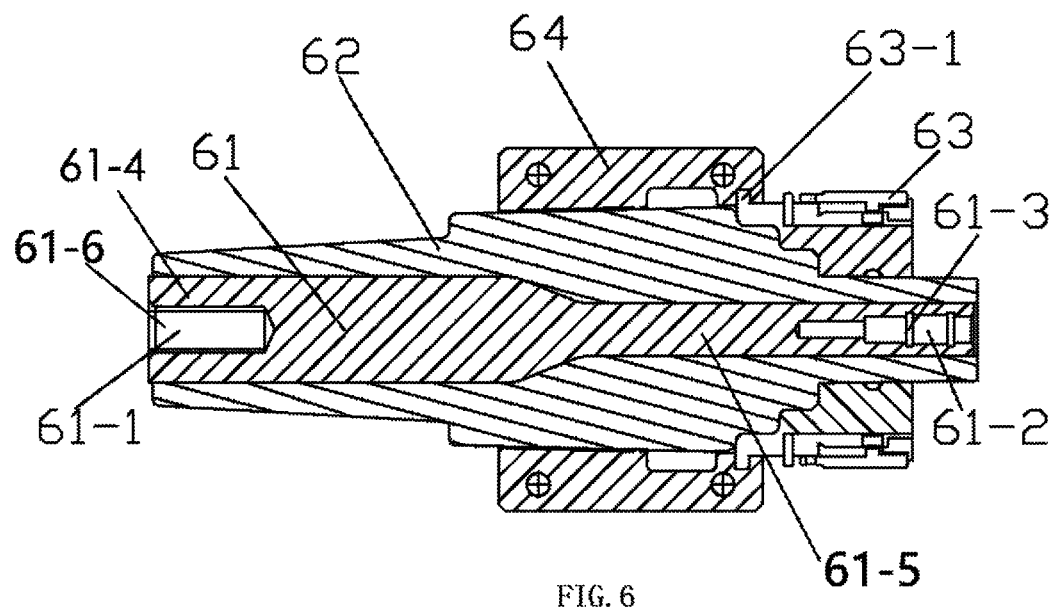
FIG. 6 is an axial cross-sectional view of FIG. 5.
Figure 7:
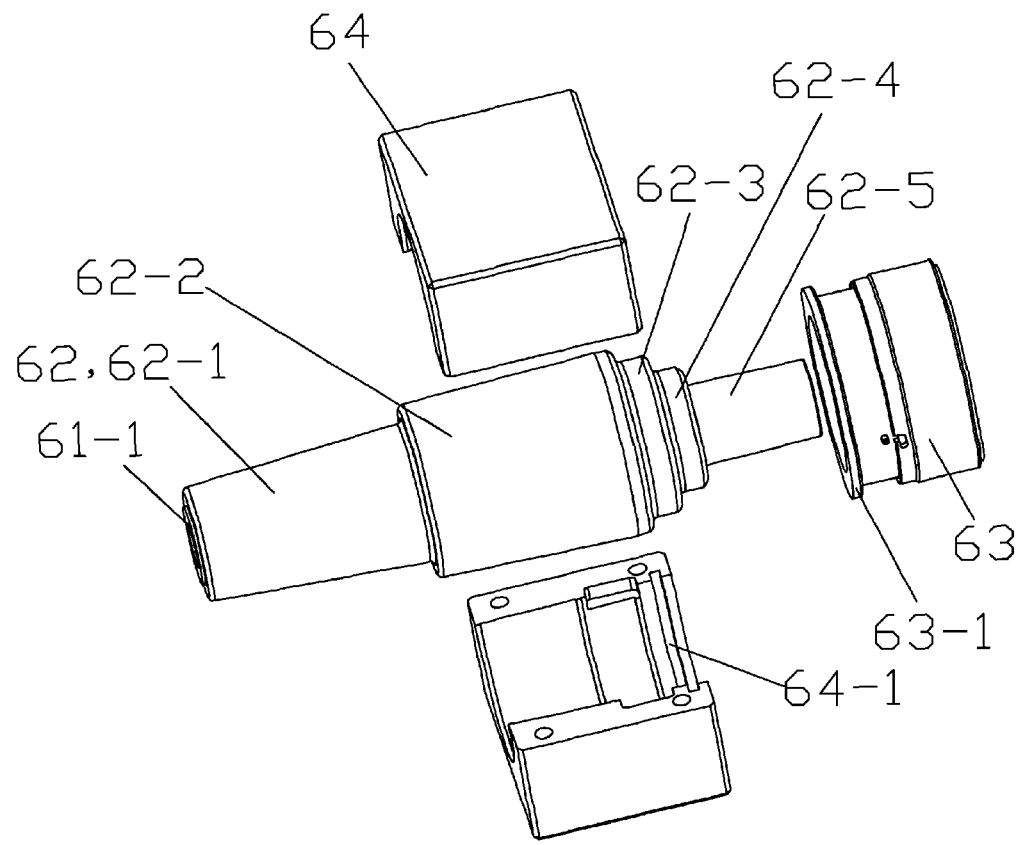
FIG. 7 is schematic structural view of split main components of the linear adapter shown in FIG. 5.

Referring to FIGS. 5-7, the linear adapter 6 mainly includes a conductive rod 61, an insulation layer 62, a quick engagement connector 63, and a housing 64.

The conductive rod 61 includes a front cylinder body 61-4 and a rear cylinder body 61-5, both of which are connected together as one piece, and a diameter of the front cylinder body 61-4 of the conductive rod 61 is greater than a diameter of the rear cylinder body 61-5. A thread hole 61-6 that concaves inward from front to rear is disposed inside the front cylinder body 61-4 of the conductive rod 61 along an axial direction. Threads 61-1 are fixedly disposed in the thread hole 61-6 of the conductive rod 61 for fixedly connecting to a T-shaped cable terminal 5. A stair-shaped bypass cable plug hole 61-2 that concaves inward from rear to front is disposed in the rear cylinder body 61-5 of the conductive rod 61 along the axial direction. Two elastic fastening rings 61-3 are coupled to the bypass cable plug hole 61-2, which are disposed in the front and in the back, respectively.

In this embodiment, a material of the insulation layer 62 is preferred to be EPDM rubber material having a compressive stress of 8-12 kg/cm2. The insulation layer 62 covers an outside surface of the conductive rod 61. The insulation layer 62 is a whole piece. The insulation layer 62 includes, sequentially from front to rear, a first truncated cone portion 62-1, a second truncated cone portion 62-2, a first cylinder portion 62-3, a second cylinder portion 62-4, and a third cylinder portion 62-5, all of which are hollow and are connected together as the whole piece. An outer diameter of the first truncated cone portion 62-1 is less than an outer diameter of the second truncated cone portion 62-2. Outer diameters of the first cylinder portion 62-3, the second cylinder portion 62-4, and the third cylinder portion 62-5 are sequentially reduced.

In this embodiment, the quick engagement connector 63 adopts a standard quick engagement connector. A front end of the quick engagement connector 63 is provided with a mounting fixation ring 63-1.

The housing 64 is a steel piece. The housing 64 is formed by two vertically symmetrical parts. After installation, an outer shape of the housing 64 is square. An inner shape of the housing 64 is compatible with an outer shape of the second truncated cone portion 62-2 of the insulation layer 62. A rear end inside the housing 64 is provided with a fixed ring socket groove 64-1. During installation, the quick engagement connector 63 is fitted and connected at a rear end of the second truncated cone portion 62-2 of the insulation layer 62, with a rear portion of the third cylinder portion 62-5 of the insulation layer 62 passing through the quick engagement connector 63 and extending outward. The mounting fixation ring 63-1 of the quick engagement connector 63 is placed in the fixation ring socket groove 64-1 of the housing 64. Further, the two vertically symmetrical parts of the housing 64 are fixedly connected, thereby fixating the quick engagement connector 63.

A fixation method of disposing the linear adapters 6 on a rear panel at a lower part of the box body 1 is: fixedly connecting the housing 64 of the linear adapter 6 with the rear panel at the lower part of the box body 1. The quick engagement connectors 63 are located outside the rear panel at the lower part of the box body 1.

Figure 2:
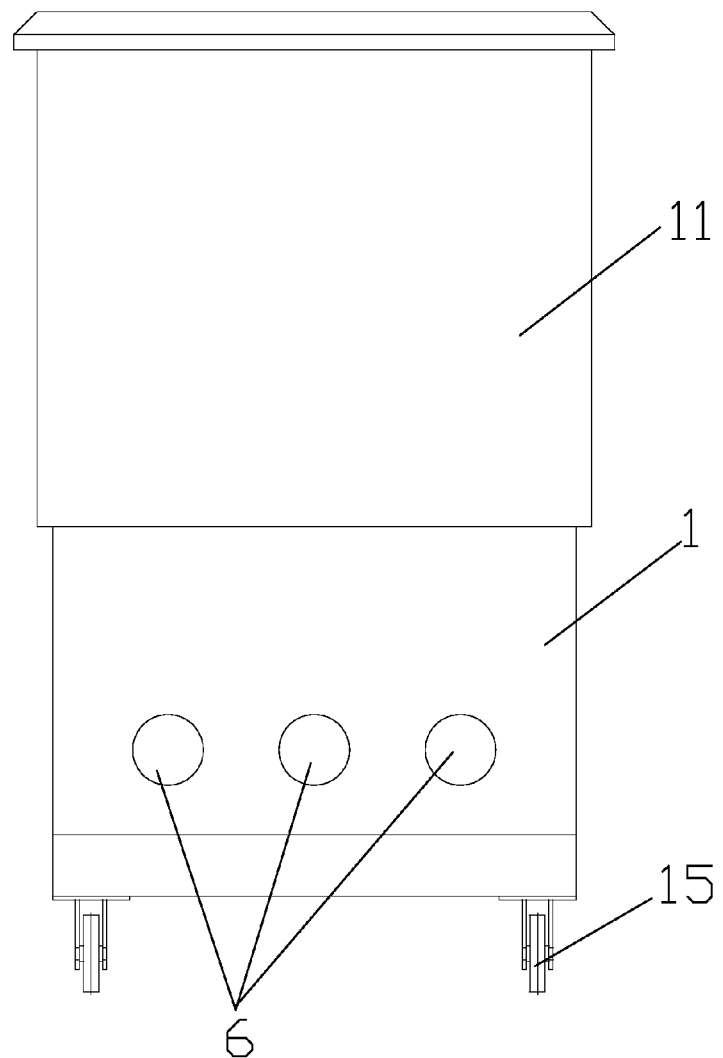
FIG. 2 is a rear view of FIG. 1.
Figure 3:
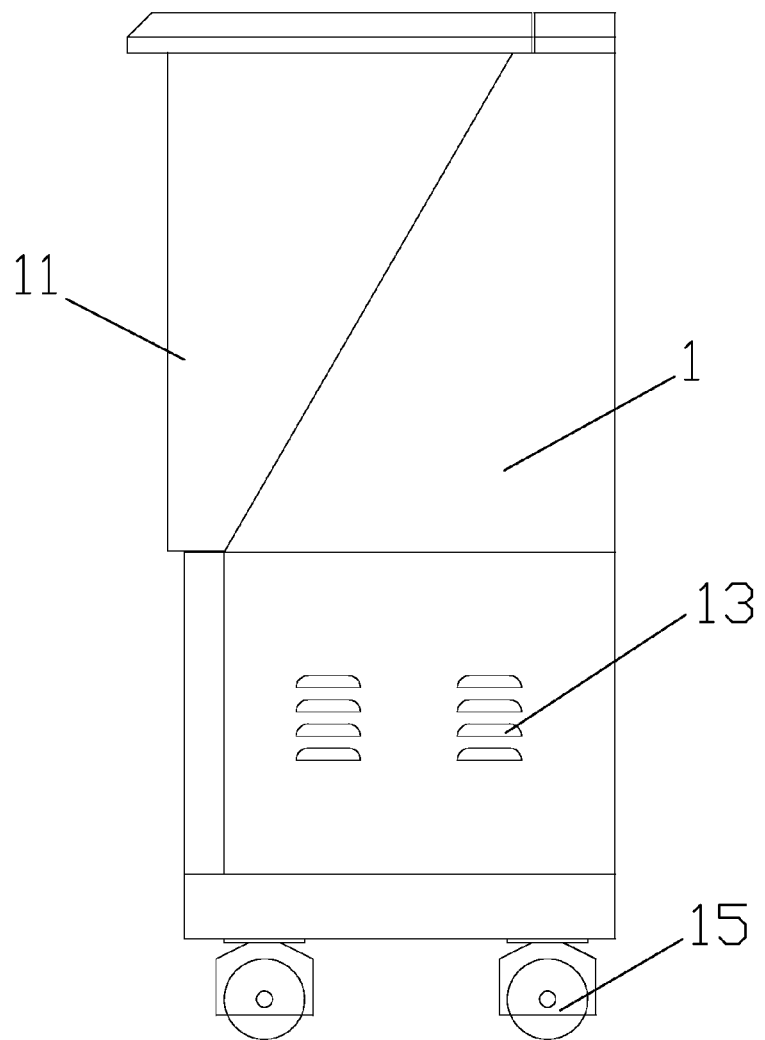
FIG. 3 is a right-side view of FIG. 1.
Figure 4:
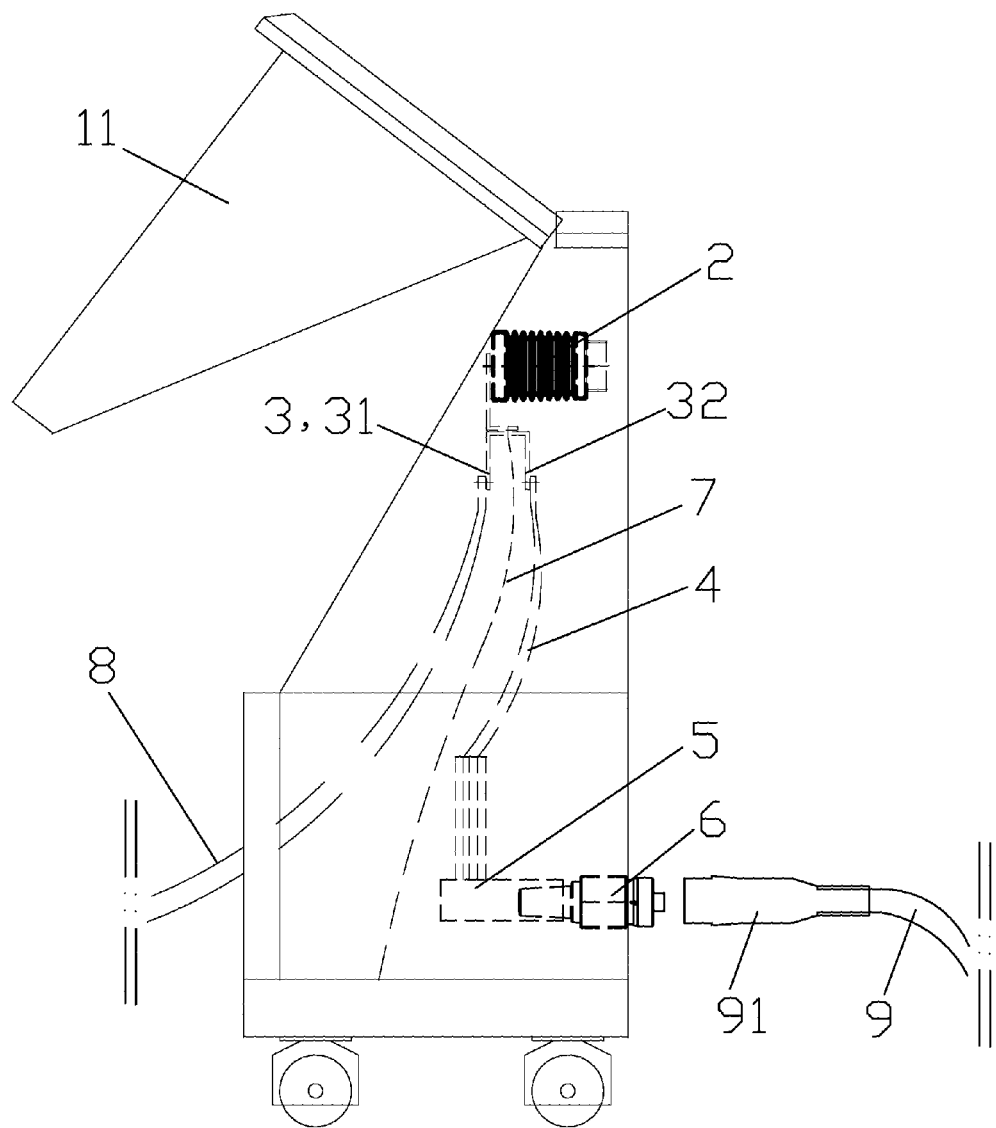
FIG. 4 is an internal structure diagram of the present invention, which also schematically shows connections among the present invention, an incoming cable of the ring main unit, and the bypass cable when the present invention is in use.

Referring to FIG. 2 and FIG. 4, three linear adapters 6 are each fixedly connected to a corresponding bolt of one of the T-shaped cable terminals 5 through the threads 61-1 in their respective conductive rods 61, with the nuts fastened. Accordingly, the three linear adapters 6, the three T-shaped cable terminals 5, the three connection wires 4, and the three copper busbars 3 form a three-phase electrical path.

The insulation spacer 7 is fixedly disposed inside the box body 1 and is located in front of the T-shaped cable terminals 5 and the connection wires 4.

When using the quick connect and disconnect cable junction box provided in this embodiment, the box body 1 is, by using the wheels 15, conveniently moved to a proper position beside a to-be-inspected ring main unit. An incoming cable 8 of the ring main unit are directed to enter the box body 1 through the cable-passing door 14 of the box body 1; A, B, and C three-phase lines of an incoming cable 8 of the ring main unit are each respectively connected to a corresponding front wire-connecting terminal 31 of one of the three copper busbars 3. Three bypass cable connectors 9 are each connected to the quick engagement connector 63 of a corresponding linear adapter 6 using its quick connector 91, thereby establishing respective electrical connections between the three bypass cable connectors 9 and the conductive rods 61 of the three linear adapters 6. Accordingly, the A, B, and C three-phase lines of the incoming cable 8 of the ring main unit, the three copper busbars 3, the three connection wires 4, the three T-shaped cable terminals 5, the three linear adapters 6, and the three bypass cables 9 form a three-phase power supply electrical path, providing power to users whose power is originally supplied by the ring main unit. The ring main unit can thus be inspected or rush repaired at a power off state.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY

The present invention has various advantageous effects.

(1) The quick connect and disconnect cable junction box in the present invention is designed based on a blueprint of an ordinary cable junction box, fixating the linear adapters for bypass cables on the junction box. An outer side of the cable junction box can be quickly connected and disconnected with a bypass cable connector, and an inner side of the cable junction box adopts a T-shaped cable terminal to connect with a copper busbar. The disclosed cable junction box has simple structure, and is low cost, easy to implement, and highly secure during usage.

(2) When using the quick connect and disconnect cable junction box in the present invention, readily-laid incoming power cable of the ring main unit can substitute a bypass cable, thereby greatly reducing the distance for laying flexible bypass cables, and effectively solving the difficulties of installing a flexible bypass cable to a power supply point over a long distance.

(3) The quick connect and disconnect cable junction box in the present invention can greatly decrease work load and shorten work duration of inspection or rush repair of a ring main unit, and can greatly reduce operation safety hazards.

What is claimed is:

1. A quick connect and disconnect square junction box assembly comprising:

a back wall, a plurality of side walls extending from the back wall and defining a front opening, a plurality of insulators, wherein said insulators are attached to the back wall, a plurality of T-shaped cable terminals;

a plurality of busbars, wherein each of the busbars is attached to one of the insulators, and each of the busbars includes a front-wire connecting terminal to connect with an incoming cable, and a rear wire-connecting terminal to connect with one of the T-shaped cable terminals, a plurality of linear adapters, wherein the linear adapters and the T-shaped cable terminals are attached to the back wall, each of the busbars is connected to one of the T-shape terminals, and each of the linear adapters is connected to one of the busbars through one of a plurality of wires, an openable door attached to side walls of the square box, and heat dissipation windows attached to a front of the side walls;

wherein each of the linear adapters includes a conductive rod, an insulation layer, a quick engagement connector, and a housing;

the conductive rod includes a front cylinder body and a rear cylinder body, and a diameter of the front cylinder body of the conductive rod is greater than a diameter of the rear cylinder body; a thread hole that concaves inwardly is disposed in the front cylinder body of the conductive rod along an axial direction; threads are fixedly disposed in the thread hole of the conductive rod; a bypass cable plug hole that concaves inwardly is disposed in the rear cylinder body of the conductive rod along the axial direction, an elastic fastening ring is coupled to the bypass cable plug hole;

the insulation layer covers an outside surface of the conductive rod, the insulation layer includes, sequentially from front to rear of the insulation layer, a first truncated cone portion, a second truncated cone portion, a first cylinder portion, a second cylinder portion, and a third cylinder portion, an outer diameter of the first truncated cone portion is less than an outer diameter of the second truncated cone portion, an outer diameter of the first cylinder portion is greater than an outer diameter of the second cylinder portion, and the outer diameter of the second cylinder portion is greater than an outer diameter of the third cylinder portion;

the quick engagement connector is fitted and connected at a rear end of the second truncated cone portion of the insulation layer, and a rear portion of the third cylinder portion of the insulation layer passes through the quick engagement connector and extends outwardly; the housing is fixedly installed on an outer surface of the second truncated cone portion of the insulation layer and is fixedly connected to a front end of the quick engagement connector;

the quick engagement connector of the linear adapter is located outside the back wall of the square box; each of the linear adapters is fixedly connected, through the threads in the conductive rod of the linear adapter, to a corresponding bolt of one of the T-shaped cable terminals; an upper end of each of the T-shaped cable terminals is, using one of the wires, electrically connected to the corresponding rear wire-connecting terminal of one of the busbars;

an insulation spacer is fixedly disposed inside the box assembly and is located in front of the T-shaped cable terminals and the wires; and during operation, the front wire-connecting terminals of the busbars are respectively connected to corresponding power lines of the incoming cable of a ring main unit; the linear adapters are connected, respectively through the quick engagement connectors, with quick connectors of bypass cables.

2. The quick connect and disconnect square junction box assembly according to claim 1, wherein external dimensions of the square box are 680 millimeter in length, 535 millimeter in width, and 1150 millimeter in height.

3. The quick connect and disconnect square junction box assembly according to claim 1, wherein the T-shaped cable terminals are standard bolt-fastening type T-shaped cable terminals.

4. The quick connect and disconnect square junction box assembly according to claim 1, wherein:

the quick engagement connectors of the linear adapters are standard quick engagement connectors;

a front end of the quick engagement connector is provided with a mounting fixation ring;

the housing of each of the linear adapters is formed by two vertically symmetrical parts;

an outer shape of the housing of each of the linear adapters after installation is square;

an inner shape of the housing of each of the linear adapters is compatible with an outer shape of the second truncated cone portion of the insulation layer;

a rear end inside the housing of each of the linear adapters is provided with a fixation ring socket groove; and the quick engagement connector is fixedly connected to the housing through a compatible coupling between the mounting fixation ring and the fixation ring socket groove.

5. The quick connect and disconnect square junction box assembly according to claim 1, wherein a material of the insulation layers of the linear adapters are EPDM (Ethylene Propylene Diene Monomers) rubber material having a compressive stress of 8-12 kilogram per centimeter square.

* * * * *